United States Patent Office 3,087,783
Patented Apr. 30, 1963

3,087,783
PROCESS FOR THE MANUFACTURE OF ALKALI METAL PHOSPHATES
Gerhard Hartlapp, Knapsack, near Cologne, Waldemar Bielenberg, Cologne-Klettenberg, and Harri Kribbe, Knapsack, near Cologne, Germany, assignors to Knapsack-Griesheim Aktiengesellschaft, Knapsack, near Cologne, Germany, a corporation of Germany
No Drawing. Filed Nov. 17, 1959, Ser. No. 853,460
4 Claims. (Cl. 23—106)

The invention relates to a process for the manufacture of alkali metal phosphates from alkali metal chlorides, phosphorus and oxygen.

As a rule, alkali metal phosphates are at present obtained by reacting phosphoric acid with alkali metal carbonates or alkali metal hydroxides which, on their part, must first be prepared from alkali metal chlorides. Attempts have been made to avoid this detour by causing phosphoric acid of $P_2O_5$ to act upon alkali metal chlorides direct; however, the proposals made hitherto have not matured into processes which can be carried out on an industrial scale, for the reasons set forth below.

In order to solve this problem with the use of alkali metal halides, there may, on principle, be used the following methods which may be subsumed under two groups.

The first group operates in the presence of water according to the reaction equations:

(1a) $2P_2O_5 + 4NaX + 2H_2O = 4NaPO_3 + 4HX$ (X=chlorine)

(1b) $P_4 + 5O_2 + 4NaX + 2H_2O = 4NaPO_3 + 4HX$ (X=chlorine)

The reaction according to (1b) takes place simultaneously with the combustion of phosphorus in the presence of water vapor while the thermal energy released in the course of the combustion is utilized for carrying out the reaction.

The second group operates in the absence of $H_2O$ and in the presence of air or $O_2$ according to the reaction equation:

(2) $2P_2O_5 + 4NaX + O_2 = 4NaPO_3 + 2X_2$ (X=chlorine)

When working according to the known working methods, there have to be taken special operational measures due to the high reaction temperatures required; moreover, the alkali metal phosphates are always obtained in the course of these processes in the form of a compact fused mass the manipulation of which is complicated. In order to avoid corrosion on the walls of the reaction space, a process became known according to which phosphorus, oxygen and alkali metal salts of oxygen-containing acids, for example carbonic acid, are reacted while being suspended in a current of gas or mixed with gas, and the reaction product is separated by rapid cooling, for example by chilling with water. This measure shall avoid that molten alkali metal phosphate deposits on the walls of the reaction space.

In addition to the aforesaid general disadvantages there arise special difficulties when using alkali metal chlorides instead of alkali metal salts of oxygen-containing acids. When working according to Reactions 1a and 1b, there is formed hydrogen chloride which, together with the reaction product, is dissolved in water which results in a partial re-formation of alkali metal chloride. Also when working according to (2), it was not possible with the processes known up to now to otbain a final product being free from unconverted alkali metal chloride. While the carbonates decompose at the high reaction temperatures to form alkali metal oxides and $CO_2$, alkali metal chlorides—inasmuch as they are not chemically converted—evaporate in the undecomposed state and, upon chilling, deposit together with the alkali metal phosphate so that they are present as impurities in the final product.

Now we have found that these disadvantages can be overcome and alkali metal phosphates be obtained that are practically free from chloride when working—in the course of manufacturing alkali metal phosphates from alkali metal chlorides, phosphorus and oxygen—according to the invention in a manner such that alkali metal chloride, in the presence of oxygen, is introduced in the finest possible division, with the exclusion of water vapor, into a phosphorus flame fed with molten phosphorus, while the oxygen is supplied in an amount which is at least sufficient to warrant, in addition to the conversion to alkali metal phosphates, also the oxidation of the chlorine ion to form free chlorine, and the reaction product is subsequently worked up according to known methods. In this case it is possible to cause the $P_2O_5$ to act upon the alkali metal chloride practically in the "statu nascendi," and it was found—and this being surprising—that now the conversion of the alkali metal chloride follows a quantitative course so that impurities in the reaction product caused by unconverted chloride practically no longer occur. The reaction now takes place according to the following reaction equation:

(3) $P_4 + 6O_2 + 4KCl = 4KPO_3 + 2Cl_2$ wherein, in addition to the conversion to alkali metal phosphates, the chlorine ion is oxidized to form free chlorine. In the course of this conversion, oxygen must at least be present in the amount calculated according to Equation 3 since otherwise, as has been ascertained, the oxidation is not complete and there takes place a partial formation of $POCl_3$. As is well known, $POCl_3$ decomposes instantly in an aqueous medium with the formation of $HCl$ and $H_3PO_4$, and from $HCl$ and the reaction product there takes place the re-formation of alkali metal chloride. In order to bring about the complete oxidation of the chlorine ion to form free chlorine, it is necessary to apply a surplus of oxygen of at least about 30%, preferably about 50%, of the stoichiometric amount calculated according to the equation.

The process of the present invention can be carried out with special advantage when the alkali metal chloride, if necessary suspended in a current of oxygen and/or air, is atomized into the phosphorus flame.

The burner arrangement for the phosphorus flame must be adjusted in a manner such that there are reacted on 100 grams of phosphorus about 90 to 500 liters, preferable 180 liters, of pure oxygen, or corresponding amounts of various air-$O_2$ mixtures.

Only by applying the methods according to the invention has it become possible to attain with certainty the high-temperature required for the reaction according to Equation 3 and the finest possible division of the components necessary for the quantitative conversion. As alkali metal chloride there is preferably used sodium chloride, which is especially economic which fact, however, should not be understood as a limitation to this compound. When treating the hot reaction product with an aqueous solution, water vapor forms of necessity. In order to prevent with certainty water vapor from penetrating into the zone of flame or coming into contact with the finely divided alkali metal chloride, it is advantageous to have the phosphorus flame with its zone of flame directed downwards burning out of a burner installed on the upper end of the reaction tower and the alkali metal chloride sprayed into the flame by means of a spraying nozzle installed at about the same height or higher. In this manner the direction of the gas current is determined, said current flowing from above to below. The flow can be increased by suction at the lower end of the tower.

The reaction product flowing off from the zone of flame is dissolved outside the zone of flame, for example, by chilling with water or an aqueous solution of phosphate. In the course of this operation, the $Cl_2$ having formed, whose solubility in an aqueous medium having a pH of 7 is almost zero, is not dissolved and is discharged from the tower together with the waste gas without attacking in any way the reaction product, as this is done, for example, by hydrochloric acid.

Phosphate and/or $P_2O_5$ possibly carried along in the waste gas can be separated from the waste gas in a suitable and known manner, for example by means of an absorption vessel and combined with the main quantity of the reaction product and thus worked up.

According to the process of the invention, phosphorus in the molten state is introduced into a suitable burner or burner aggregate together with surplus oxygen, and burned. The alkali metal chloride, for example sodium chloride, which is present in solid form, must in very fine division be atomized direct into the phosphorus flame which has a temperature of about 2000° C. The greater part of the sodium chloride evaporates in the flame (evaporation temperature 1465° C.), so that the $P_2O_5$ formed and the oxygen act upon the vapors, in the course of which process free chlorine is obtained. When burning, for example, 600 kilos of P/h., there are obtained 1370 kilos of $P_2O_5$/h. Depending on the desired proportion of $P_2O_5:Na_2O$ in the reaction product, the amount of NaCl required in each case must be supplied correspondingly. According to Equation 3, the calculated amount of NaCl is 1120 kg./h., i.e. 312 grams of NaCl per second must be sprayed into the phosphorus flame. When the amount of NaCl is increased, the reaction product obtained has a higher content of alkali metal. When adjusting the supply of the components correspondingly, there are obtained reaction products of the general formula $$(P_2O_5)_x \cdot (Na_2O)_y$$

in which the ratio of $x:y$ is between 1 and about 0.5 without the reaction product containing unreacted NaCl. Since the chlorine formed in the course of the reaction is practically insoluble at temperatures of about 100° C. in aqueous solutions of phosphate having a pH value not exceeding 7, there can, in the process of the invention, be taken all known measures for chilling the reaction product, avoiding the risk of corrosion and removing the considerable reaction heat without re-formation of the reaction product setting in. The reaction product is suitably chilled with water containing phosphate.

Inasmuch as air is used for the combustion, it should be suitably dried previously. Air enriched with $O_2$ and pure oxygen are normally supplied in the dried state.

The chlorine formed is discharged from the tower together with the waste gas and can additionally be obtained as such in a special installation.

The reaction product is in general discharged at the bottom of the tower as a concentrated solution, partially hydrolyzed, and can either be processed as a solution or be isolated by crystallization.

The proposed process offers for the first time the possibility of obtaining in an economically especially advantageous manner the alkali metal phosphates necessary for the manufacture of polyphosphates such as, for example, sodium tripolyphosphate and tetrasodium pyrophosphate.

The following examples serve to illustrate the invention, but they are not intended to limit it thereto:

*Example 1*

434 kilos of ground sodium chloride having a content of 99.8% of NaCl suspended and thus most finely divided in 100 cu. m. of oxygen are atomized per hour into a phosphorus flame which is fed per hour with 190 kilos of molten phosphorus and 550 cu. m. of air enriched with oxygen (having an oxygen content of about 50%). The proportion of the $P_2O_5$ to $Na_2O$ formed is 1:1.3.

The reaction product formed (about 600 kilos/hour) which has a temperature of about +600° to +700° C. is cooled by chilling with water and is simultaneously dissolved; then the crystallized phosphate is obtained from this solution according to known methods. The hot waste gases which likewise have a temperature of about +600° to +700° C. and still contain about 10% of the alkali metal phosphate formed, are washed out in an associated absorption installation by means of concentrated phosphoric acid as a washing solution, whereby the phosphate is separated and combined with the solution of the reaction product, while about 254 kilos of chlorine gas leave this absorption installation per hour and are conducted to a series-connected device for the manufacture of hydrochloric acid, or to some other further utilization.

The yield amounts to about 99.5% of phosphate, calculated on the originally applied molten phosphorus, said phosphate still containing about 0.3% of NaCl.

*Example 2*

460 kilos of ground potassium chloride having a degree of purity of 99.8% of KCl suspended and thus most finely divided in 100 cu. m. of oxygen are atomized per hour into a phosphorus flame fed per hour with 190 kilos of molten phosphorus and 400 cu. m. of air enriched with oxygen (having an oxygen content of about 50%). The proportion of the $P_2O_5$ to $K_2O$ formed is 1:1.0.

The reaction product formed (about 650 kilos/hour) is cooled by chilling with water and simultaneously dissolved; then the crystallized phosphate is obtained from this solution according to known methods. The waste gases are worked up in the same manner as described in Example 1 while 206 kilos of chlorine gas are obtained per hour.

The yield of phosphate is about 99.6%, calculated on the originally applied molten phosphorus, said phosphate still containing about 0.5% of KCl.

*Example 3*

600 kilos of ground sodium chloride having a degree of purity as described in Example 1 suspended and thus most finely divided in 90 cu. m. of oxygen are atomized per hour into a phosphorus flame fed per hour with 190 kilos of molten phosphorus and 560 cu. m. of air enriched with oxygen (having an oxygen content of about 55%). The proportion of the $P_2O_5$ to $Na_2O$ formed is 1:1.6.

The reaction product formed (about 660 kilos per hour) is cooled by chilling with an aqueous solution of phosphate and simultaneously dissolved; then the crystallized phosphate is obtained from this solution according to known methods. The waste gases are worked up as described in Example 1 while 345 kilos of chlorine gas are obtained per hour.

The yield of phosphate is about 99.4%, calculated on the originally applied molten phosphorus, said phosphate still containing about 0.8% of NaCl.

We claim:
1. In the process for the manufacture of alkali metal phosphates by reacting alkali metal chloride, phosphorus and an oxidizing gas selected from the group consisting of air and oxygen, the improvement of carrying out the reaction between phosphorus and alkali metal chloride substantially in the gaseous phase at temperatures of about 2000° C. by spraying the finely distributed alkali metal chloride into a flame zone fed with 90 to 500 liters oxygen per 100 grams of melted phosphorus while excluding water vapor from the flame zone, using the phosphorus and the alkali metal chloride in amounts corresponding to a molar ratio of $P_2O_5:Na_2O$ from 1:1 to 1:2, using the oxidizing gas in an excess of about 30 to about 50% based upon the stoichiometric amounts required to convert all chloride to chlorine and obtaining the phosphates of a purity of at least 99.2% in a yield of at least 99.4% based upon the applied phosphorus.

2. A process as claimed in claim 1, wherein sodium chloride is used as an alkali metal chloride.

3. A process as claimed in claim 1, wherein the phosphorus flame with its zone of flame directed downwards, burns at the upper end of a reaction zone and the alkali metal chloride is atomized into the flame at about the same height.

4. A process as claimed in claim 1, wherein the phosphorus flame, with its zone of flame directed downwards, burns at the upper end of a reaction zone and the alkali metal chloride is atomized above the flame.

References Cited in the file of this patent

UNITED STATES PATENTS

| 2,142,944 | Kerschbaum | Jan. 3, 1939 |
| 2,792,284 | Alexander | May 14, 1957 |
| 2,792,285 | Alexander et al. | May 14, 1957 |